(12) United States Patent
Lee (10) Patent No.: US 9,020,672 B2
(45) Date of Patent: Apr. 28, 2015

(54) AUTOMATIC GEAR SHIFTING SYSTEM FOR TWO-WHEEL ELECTRIC VEHICLES

(71) Applicant: National Cheng Kung University, Tainan (TW)

(72) Inventor: Sen-Yung Lee, Tainan (TW)

(73) Assignee: National Cheng Kung University, Tainan (TW)

( * ) Notice: Subject to any disclaimer, the term of this patent is extended or adjusted under 35 U.S.C. 154(b) by 173 days.

(21) Appl. No.: 13/664,781

(22) Filed: Oct. 31, 2012

(65) Prior Publication Data

US 2014/0088806 A1   Mar. 27, 2014

(30) Foreign Application Priority Data

Sep. 24, 2012 (TW) .............................. 101134862 A (51) Int. Cl.
*B60L 15/20* (2006.01)
*B62M 23/02* (2010.01)

(52) U.S. Cl.
CPC ...................................... *B60L 15/20* (2013.01)

(58) Field of Classification Search
CPC .......... B60L 15/20; B62M 1/02; B62M 23/02
USPC ......................................................... 701/22
See application file for complete search history.

(56) References Cited

U.S. PATENT DOCUMENTS

| 4,454,784 | A  | * | 6/1984  | Shimano ....................... 74/473.1 |
| 6,959,941 | B2 | * | 11/2005 | Takeda et al. .................. 280/261 |
| 2007/0222661 | A1 | * | 9/2007  | Stagliano et al. ........... 342/26 R |
| 2008/0182707 | A1 | * | 7/2008  | Yoo ............................... 475/297 |
| 2011/0079453 | A1 | * | 4/2011  | Wanger et al. .................. 180/11 |
| 2012/0112696 | A1 | * | 5/2012  | Ikeda et al. .................... 320/109 |

FOREIGN PATENT DOCUMENTS

GB              2312403 A  *  10/1997  ............. B62M 23/02

* cited by examiner

*Primary Examiner* — Yonel Beaulieu
*Assistant Examiner* — Martin Weeks
(74) *Attorney, Agent, or Firm* — Rosenberg, Klein & Lee (57) ABSTRACT

The automatic gear shifting system for two-wheel electric vehicles includes a detection unit for detecting the status of operation of the two-wheel electric vehicle, a processing unit connected with the detection unit for receiving, analyzing and filtering the detected signals so as to generate a speed-changing signal that is correspondent to the detected signal, and a driving device having a low-power motor unit and control member with multiple nodes. The driving device is connected to the operation cable of the speed changing device. The driving device receives the signals of changing speed so as to change the gears according to the signals of changing speed. A motor unit located at the mediate portion of the vehicle is coupled to the processing unit and the front chainwheel. The gears are automatically changed according to the statuses of the two-wheel electric vehicle to provide sufficient power for climbing, low-speed and high-speed operations.

10 Claims, 12 Drawing Sheets

AUTOMATIC GEAR SHIFTING SYSTEM FOR TWO-WHEEL ELECTRIC VEHICLES

FIELD OF THE INVENTION

The present invention relates to an automatic gear shifting system, and more particularly, to an automatic gear shifting system of a two-wheel electric vehicle with the motor system located at the mediate portion of the vehicle. The automatic gear shifting system automatically changes gear position by detecting the operation status of the two-wheel electric vehicle.

BACKGROUND OF THE INVENTION

The drawbacks for consuming petroleum as the power source of the vehicles are studied and found as one of the main reasons to cause global warming so that the green energy is developed to be used to drive vehicles. Electric vehicles are developed because the knowledge for utilizing electric power to vehicles is mature.

Figure 1:
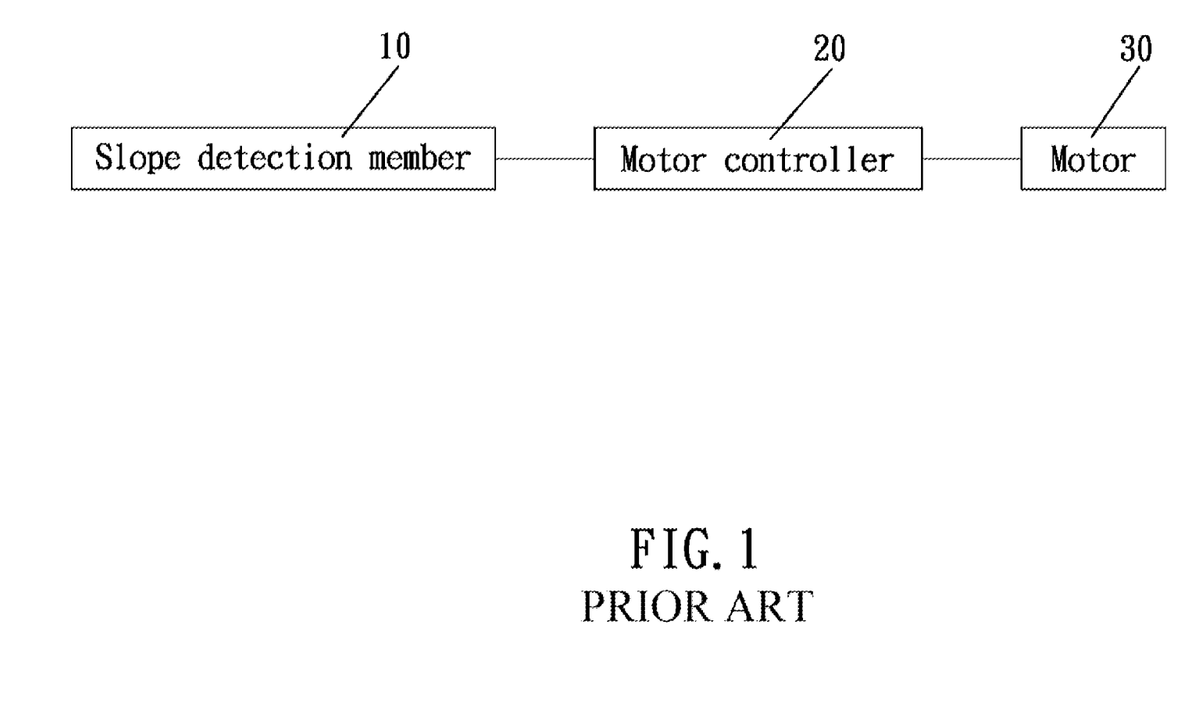
FIG. 1 shows the control method of the conventional electric vehicle on slope and the detection system of the conventional electric vehicle.

Taiwan Utility Patent No. M570880 discloses an electric vehicle with a slope detection member which is cooperated with the motor to output suitable torque. When the slope detection member detects the ground is a flat and horizontal ground, the motor works normally. When the slope detection member detects the ground has an upward slope, the motor provides more power to the vehicle to assist the vehicle to move upward. When the slope detection member detects the ground is a downward slope, the motor transfers the electric power into magnetic braking force to reduce the speed. As shown in FIG. 1, the slope detection member 10 is cooperated with the motor controller 20 which is electrically connected to a motor 30. When the slope detection member 10 detects the slope of the ground, the motor controller 20 changes the input current to the motor 30 to change the output torque to drive the vehicle. The vehicle is driven by the front wheel and the rear wheel, rather than by the motor system located at the mediate portion of the vehicle. There is no function to change gears by the speed-changing device so that the change of input current to the motor 30 cannot provide sufficient torque.

Figure 2:
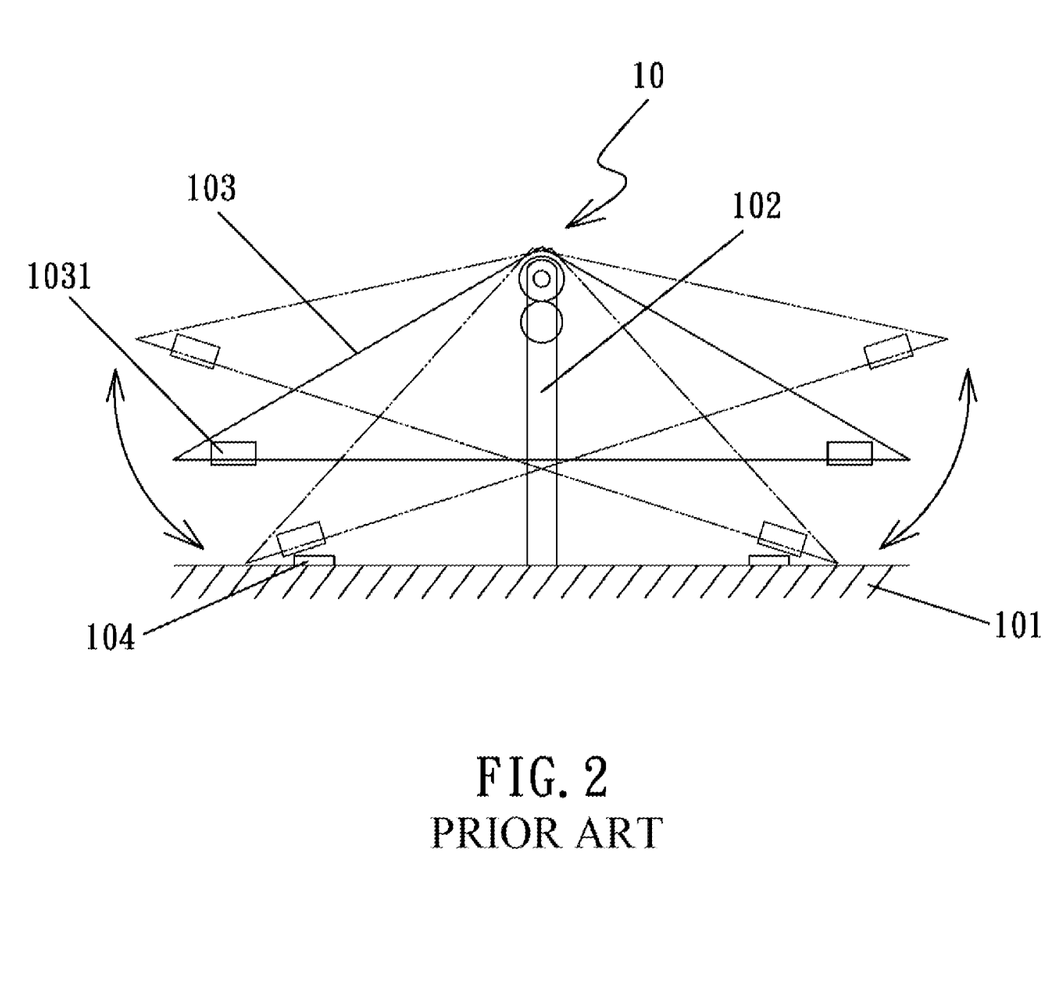
FIG. 2 shows the conventional slope detection system.

Besides, no matter the vehicle is driven by the motor installed at the mediate portion or by the front and rear wheels, the slope detection member may receive noisy and scattered signals because of the roughness of the road so that the motor provides unstable current according to the signals received, and this may cause accident. Taiwan Patent No. 570880 is shown in FIG. 2 which discloses a slope detection system 10 which has a base 101 with a link 102 which is pivotably connected to a frame 103 and has a mechanic damper. Two magnets 1031 are respectively located on the two ends of the frame 103 and the base 101 has two linear detection members 104 which are located corresponding to the magnets 1031. The linear detection members 104 are electrically connected to the slope processing circuit. The linear detection members 104 detect the distance between the magnets 1031 and accordingly generate a potential signal which is transferred into slope signal by the slope processing circuit. The slope signal is then sent to the motor controller 20 to change the current of the motor 30. However, the frame 30 shakes due to the vibration from the road so that the mechanic damper cannot accurately respond to the actual slope. The noisy and scattered signals are sent to the motor controller 20 which passes the noisy and scattered signals to the motor 30 so that the driving power from the motor 30 is unstable and this can be dangerous to the driver.

Figure 3:
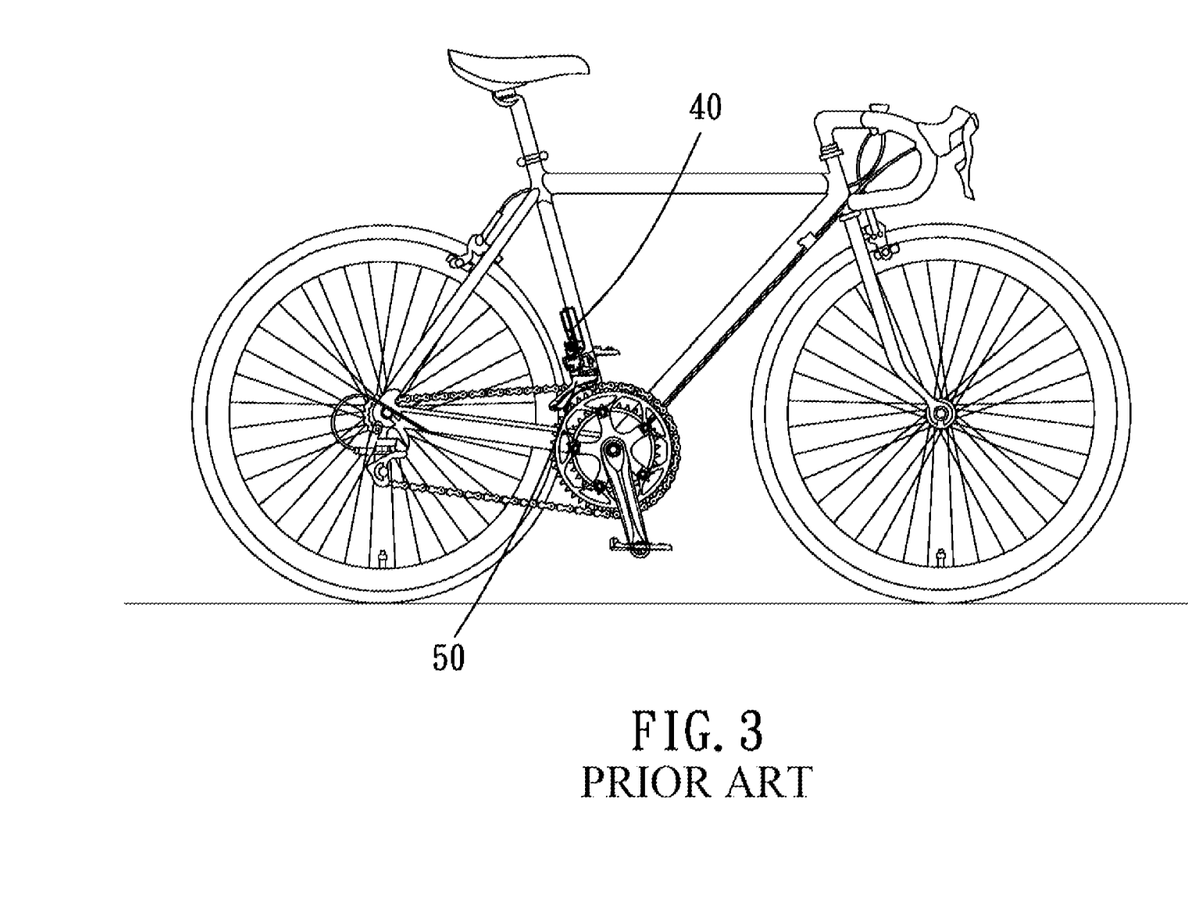
FIG. 3 shows that the conventional gear-shifting device is directly connected to the front speed-changing device of the conventional electric vehicle.
Figure 4:
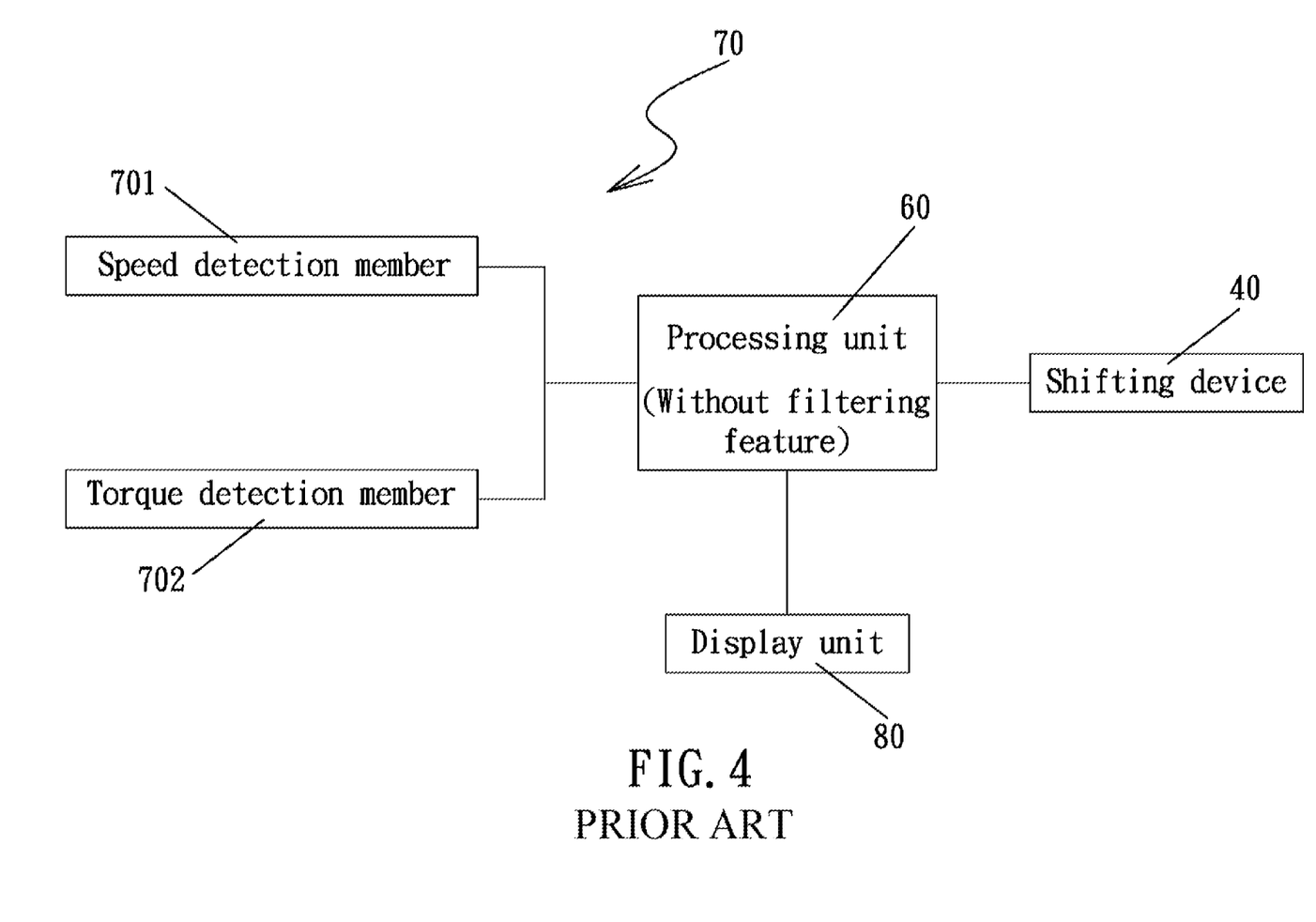
FIG. 4 shows the electric gear shifting device of the conventional non-electric, non-electric assistance bicycle.

U.S. Pat. No. 7,306,531 discloses an electric bicycle derailleur as shown in FIGS. 3 and 4, wherein the electric motor of the shifting device 40 is directly connected to the front derailleur 50 or the rear derailleur. The electric motor is connected with a processing unit 60 which does not have a filtering member. The processing unit 60 is electrically connected to a detection device 70 which can be a speed detection member 701 or a torque detection member 702. After the processing unit 60 receives the signals from the detection device 70, the shifting device 40 adjusts the gears of the front derailleur 50 or the rear derailleur so as to display the gear on the display unit 80. However, the processing unit 60 does not have a proper logic control process to be cooperated with the electric motor, and cannot filter the noisy and scattered signals from the rough road so that the gear shifting becomes unstable. Furthermore, the connection between the shifting device 40 and the front derailleur 50 or the rear derailleur is so complicated which is a burden for maintenance. The system cannot be cooperated with the internal speed-changing system.

In addition, the automatic gear shifting system for two-wheel vehicle should be installed corresponding to the motor system located at the mediate portion of the vehicle so as to smoothly shift the gears. The gear-changing signal processing unit of U.S. Pat. No. 7,306,531 B2 (electric bicycle derailleur) and U.S. Pat. No. 6,959,941 B2 (bicycle shift control apparatus that selectively restricts speed stages) does not have suitable control logic process to be cooperated with the electric motor of the two-wheel electric vehicle so that the two prior arts cannot be used as the automatic gear shifting system of the two-wheel electric vehicles with the motor system located at the mediate portion of the vehicle.

The conventional two-wheel electric vehicles are driven by the front wheel or the rear wheel, the motor system is not located at the mediate portion of the vehicle, so that the conventional two-wheel electric vehicles do not have gear shifting functions. The only way to change the speed is to change the input current to change the torques. This cannot provide sufficient torques.

When the conventional two-wheel electric vehicles are operated on slopes, due to the roughness of the road, the slope detection member cannot verify the actual road condition and affected by noisy and scattered signals. Therefore the motor provides unstable current according to the signals received, and this may cause accident.

The speed-changing device of the conventional two-wheel electric vehicles is connected to the front or rear speed-changing members, which is complicated and has high maintenance fee, and cannot be cooperated with internal speed-changing system. There is no proper control logic process provided for the electric motor of the conventional two-wheel electric vehicles so that the existed speed-changing device is not suitable for being cooperated with the two-wheel electric vehicles with the motor system located at the mediate portion.

The present invention intends to provide an automatic gear shifting system of a two-wheel electric vehicle with the motor system located at the mediate portion of the vehicle, the automatic gear shifting system improves the shortcomings of the conventional ones.

SUMMARY OF THE INVENTION

The present invention relates to an automatic gear shifting system of a two-wheel electric vehicle with the motor system located at the mediate portion of the vehicle, and the automatic gear shifting system comprises a detection unit for detecting operation status of the two-wheel electric vehicle and the detection unit sends a detected signal. A processing unit is connected to the detection unit, a driving device and a motor system located at mediate portion of the vehicle. The processing unit receives, analyzing and filtering the detected signal and generates a speed-changing signal, corresponding to the detected signal, to the driving device and the motor system so as to shift gears by cooperation of the driving device and the motor system.

The driving device has a motor unit which is connected to the processing unit and has an output shaft which is connected to a disk and a control member which has multiple nodes. The disk is connected to a speed-changing device by an operation cable. The speed-changing device has multiple gear positions. The interior of the disk is fixed to the output shaft and the operation cable is connected to outside of the disk. The operation cable is connected to the speed-changing device. The motor unit receives the speed-changing signal to drive the output shaft to change the node of the control member and to rotate the disk so that the operation cable is driven to change the gear position of the speed-changing device.

The motor system is mechanically connected to a chain-wheel of the two-wheel electric vehicle. The motor system provides power to the two-wheel electric vehicle by the speed-changing signal and the shifting of the speed-changing device.

The driving device generates a feed-back signal to the processing unit when the gear shifting to the speed-changing device is completed. The processing unit is acknowledged the gear position of the speed-changing device. The processing unit receives and analyzes the detected signal to the feed-back signal, and filters the detected signal and generates a speed-changing signal, corresponding to the detected signal and the feed-back signal, to the driving device.

A display unit is connected to the processing unit which generates a display signal to the display unit when receiving the feed-back signal. The display unit receives the display signal to display the gear position of the speed-changing device.

The operation status includes driving force, driving speed, power consumption, electric-assistance level, present gear position and slope. The detection unit comprises a slope detection member, a speed detection member, a torque detection member and a pressure detection member, wherein the slope detection member has a gravity sensor (G-sensor) or a leveling device.

The processing unit is electrically connected to the driving device and the motor system. The processing unit filters noisy and scattered signals to provide stable control signals.

The speed-changing device is a front speed-changing device, a rear speed-changing device or an internal speed-changing device.

Alternatively, the present invention provides an automatic gear shifting system and comprises a motor unit, a disk and a control member. The motor unit has an output shaft which is mechanically connected to the disk and the control member. The interior of the disk is fixed to the output shaft and an operation cable is connected to outside of the disk. The operation cable is connected to the speed-changing device which has multiple gear positions. The control member has an inner ring and an outer ring, wherein the outer ring is fixed to the frame of a two-wheel electric vehicle and the inner ring is connected to the output shaft. The inner ring has multiple nodes relative to the outer ring. The nodes are located corresponding to the gear positions of the speed-changing device. When the motor unit receives gear-shifting commands, the inner ring is rotated to change the node and the disk drives the operation cable to shift the gear position of the speed-changing device.

The outer periphery of the inner ring has at least one resilient member fixed thereto and the at least one resilient member has a contact portion. The outer ring has multiple recesses defined in the inner periphery thereof and the recesses are located corresponding to the contact portions which are engaged with the recesses to form the nodes.

The inner periphery of the outer ring has at least one resilient member fixed thereto and the at least one resilient member has a contact portion. The inner ring has multiple recesses defined in the outer periphery thereof. The number of the recesses is larger than that of the at least one resilient member. The recesses are located corresponding to the contact portions which are engaged with the recesses to form the nodes.

The present invention uses the detection unit to detect the operation status of the two-wheel electric vehicle and the operation status includes the driving force, the driving speed, the power consumption, the electric-assistance level, the present gear position and the slope where the vehicle is operated. The processing unit filters the detected signal to avoid the system from providing incorrect speed-changing signal to make the motor system to respond unstably. The processing unit receives, analyzing and filtering the detected signal and generates a speed-changing signal, corresponding to the detected signal, to the driving device and the motor system so as to shift gears smoothly by cooperation of the driving device and the motor system. The correct gear shifting avoids unnecessary electric power consumption.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 5 to 10, the first embodiment of the automatic gear shifting system of a two-wheel electric vehicle with the motor system located at the mediate portion of the vehicle comprises a detection unit 1 for detecting operation status of the two-wheel electric vehicle and sending a detected signal. The operation status includes the driving force, the driving speed, the power consumption, the electric-assistance level, the present gear position and the slope where the vehicle is operated. The detection unit 1 comprises a slope detection member 11, a speed detection member 12, a torque detection member 13 and a pressure detection member 14, wherein the slope detection member 11 has a gravity sensor (G-sensor) or a leveling device.

A processing unit 2 is connected to the detection unit 1, a driving device 3 and a motor system 4 located at mediate portion of the vehicle. The processing unit 2 receives, analyzes and filters the detected signal and generating a speed-changing signal, corresponding to the detected signal, to the driving device 3 and the motor system 4 so as to shift gears by cooperation of the driving device 3 and the motor system 4. The processing unit 2 filters the detected signal to avoid the system from providing incorrect speed-changing signal to make the motor system 4 to respond unstably.

The driving device 3 has a motor unit 31 which is connected to the processing unit 2 and has an output shaft 32. The output shaft 32 of the motor unit 31 is connected to a disk 33 and a control member 34 which has multiple nodes. The disk 33 is connected to a speed-changing device 6 by an operation cable 5. The speed-changing device 6 has multiple gear positions. The interior of the disk 33 is fixed to the output shaft 32 and the operation cable 5 is connected to outside of the disk 33. The operation cable 5 is connected to the speed-changing device 6, so that the driving device 3, the operation cable 5 and the speed-changing device 6 are mechanically connected to each other. The driving device 3 replaces the conventional manual shifting device. The motor unit 31 receives the speed-changing signal to drive the output shaft 32 to change the node of the control member 34 and to rotate the disk 33 so that the operation cable 5 is driven to change the gear position of the speed-changing device 6. The driving device 3 and the speed-changing device 6 have different nodes. The driving device 3 receives the speed-changing signal from the processing unit 2 so as to shift the gear position according to the speed-changing signal. The speed-changing device 6 is a front speed-changing device 6a, a rear speed-changing device 6b or an internal speed-changing device 6c. The driving device 3 generates a feed-back signal to the processing unit 2 when the gear shifting to the speed-changing device is completed. The processing unit 2 is then acknowledged the gear position of the speed-changing device 6.

The motor system 4 is mechanically connected to the chainwheel 7 of the two-wheel electric vehicle. The motor system 4 provides power to the two-wheel electric vehicle, it also cooperates with the driving device 3 by the speed-changing signal so shift the gear positions of the speed-changing device 6 smoothly. The motor system 4 is a coaxial motor, an assembled motor or a tilt motor.

A display unit 8 is connected to the processing unit 2 which generates a display signal to the display unit 8 when receiving the feed-back signal, the display unit 8 receives the display signal to display the gear position of the speed-changing device 6 accordingly.

The present invention uses the detection unit 1 to detect the operation status of the two-wheel electric vehicle and sends a detected signal to the processing unit 2. The operation status includes the driving force, the driving speed, the power consumption, the electric-assistance level, the present gear position and the slope where the vehicle is operated. If the detection unit 1 is the slope detection member 11, the detected signal is the slope of the road. If the detection unit 1 is the speed detection member 12, the detected signal is the speed of the two-wheel electric vehicle. If the detection unit 1 is the torque detection member 13 or the pressure detection member 14, the detected signal is the driving power of the two-wheel electric vehicle. If the detection unit 1 has multiple detection members which can be the slope detection member 11, the speed detection member 12, the torque detection member 13 and the pressure detection member 14. The slope detection member 11 has a gravity sensor (G-sensor) or a leveling device. The processing unit 2 receives the detected signal from the detection unit 1 and analyzes the detected signal to decide the proper gear position. For example, if the detection unit 1 is the slope detection member 11, the processing unit 2 filters the noisy and scattered information from the detected signal and controls the driving device 3 to shift to a proper gear position relative to the slope of the road. The motor system 4 is connected to the processing unit 2 which changes the input current to the motor system 4 according to the speed-changing signal. By the cooperation between the driving device 3 and the motor system 4 according to the speed-changing signal, the gear shifting is smooth and precisely to provide proper torque to the two-wheel electric vehicle. Therefore, the driving performance is enhanced and the electric power consumption is improved.

Figure 5:
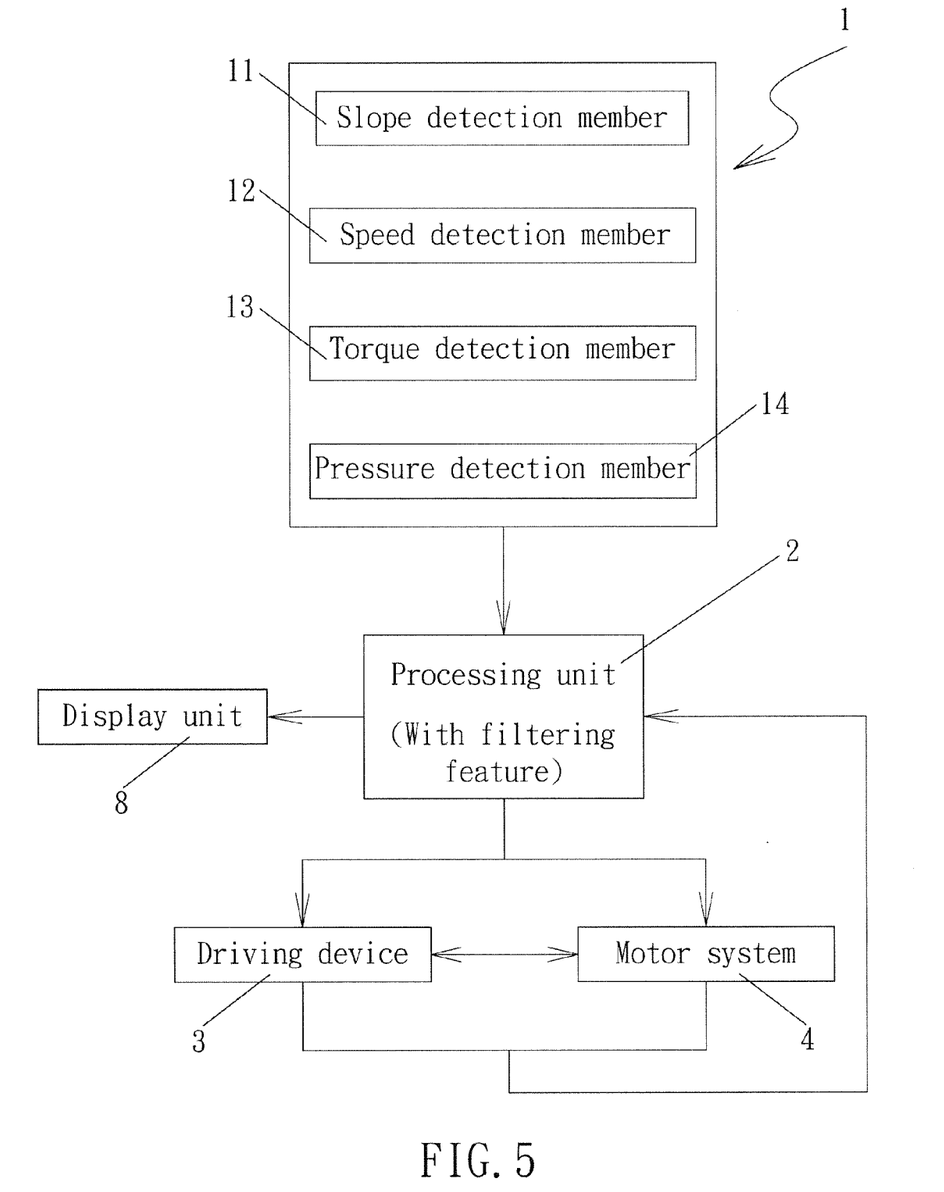
FIG. 5 shows the block diagram of the first embodiment of the automatic gear shifting system of the present invention.
Figure 6:
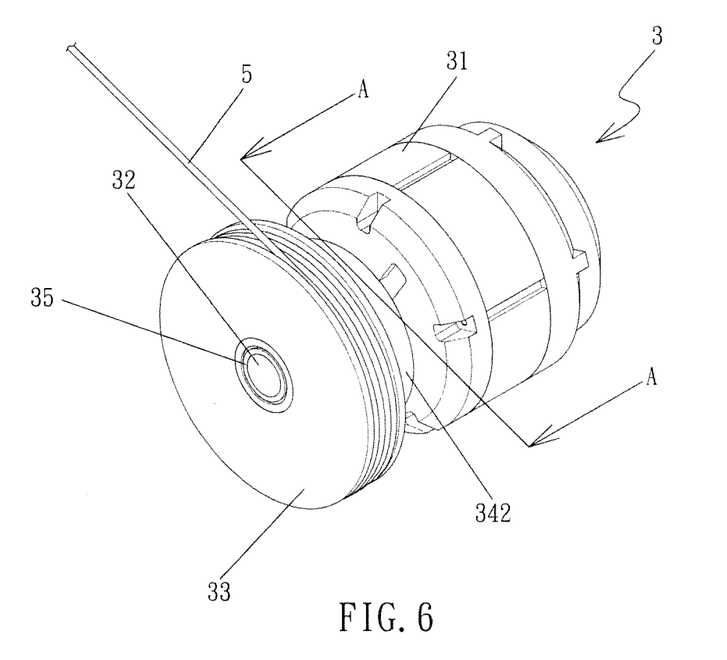
FIG. 6 is a perspective view to show the first embodiment of the automatic gear shifting system of the present invention.
Figure 7:
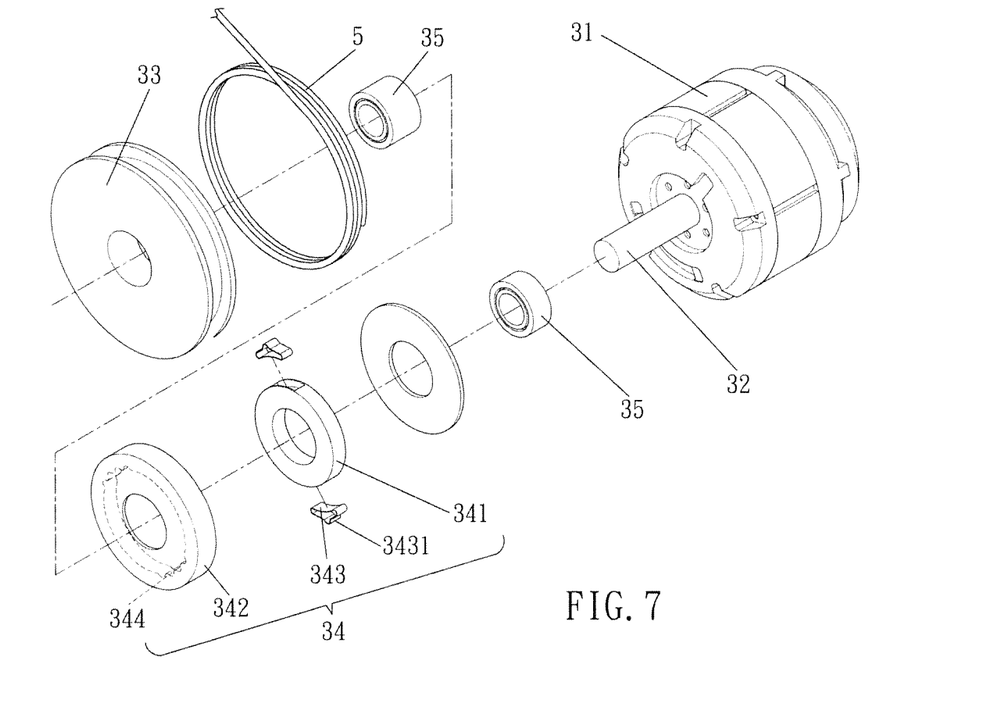
FIG. 7 is an exploded view to show the first embodiment of the automatic gear shifting system of the present invention.

As shown in FIG. 5, the driving device 3 generates a feed-back signal to the processing unit 2 when the gear shifting to the speed-changing device is completed. The processing unit 2 is then acknowledged the gear position of the speed-changing device 6. The processing unit 2 receives, analyzes and filters the detected signal from the detection unit 1 and generates a speed-changing signal, corresponding to the feed-back signal and the detected signal, to the driving device 3 and the motor system 4, so that the two-wheel electric vehicle is operated by a proper gear position. The display unit 8 receives the display signal to display the gear position of the speed-changing device 6 so that the current gear position is acknowledged by the users.

FIGS. 6 to 10 disclose a driving device 3 which comprises a motor unit 31, a disk 33 and a control member 34. The motor unit 31 is connected to the processing unit 2 and has an output shaft 32 which is mechanically connected to the disk 33 and the control member 34 by a bearing 35. The interior of the disk 33 is fixed to the output shaft 32 and an operation cable 5 is connected to outside of the disk 33. The operation cable 5 connected to a speed-changing device 6 which has multiple gear positions.

The control member 34 has an inner ring 341 and an outer ring 342, the outer ring 342 is fixed to a frame 9 of a two-wheel electric vehicle and the inner ring 341 is connected to the output shaft 32 by a bearing 35. The inner ring 341 has multiple nodes relative to the outer ring 342. The nodes are located corresponding to the gear positions of the speed-changing device 6. The outer periphery of the inner ring 341 has at least one resilient member 343 fixed thereto and the at least one resilient member 343 has a contact portion 3431. The outer ring 342 has multiple recesses 344 defined in the inner periphery thereof and the number of the recesses 344 is larger than the number of the at least one resilient member 343. The recesses 344 are located corresponding to the contact portions 3431 which are engaged with the recesses to form the nodes.

The motor unit 31 receives gear-shifting signal, the inner ring 341 is rotated to change the node of the driving device 3 corresponding to the speed-changing signal and the disk 33 drives the operation cable 5 to shift the gear position of the speed-changing device 6.

Figure 8:
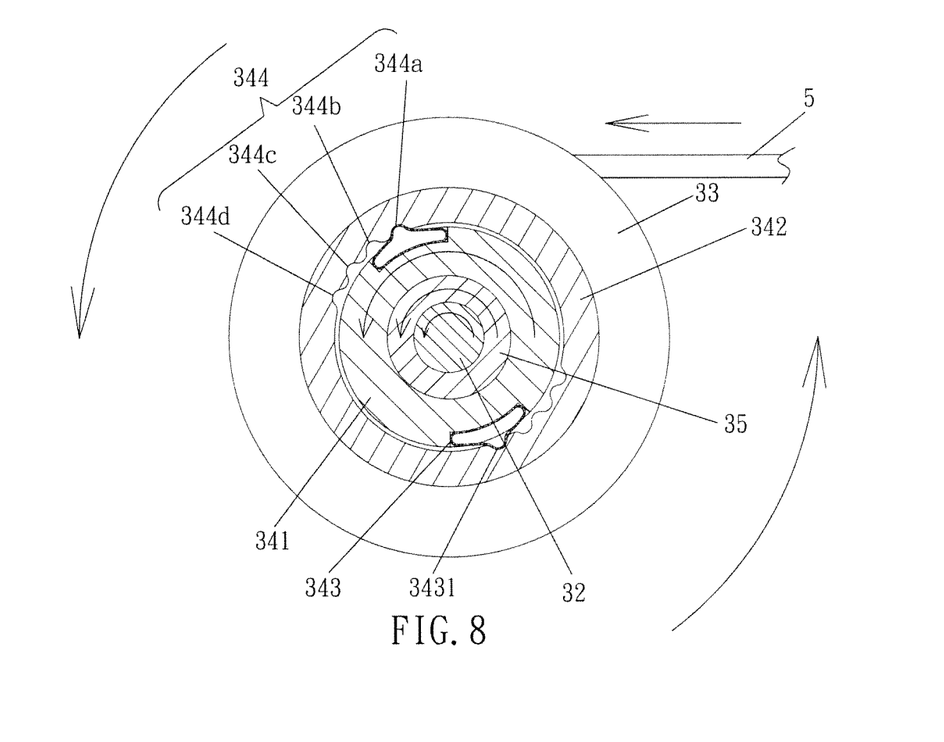
FIG. 8 is a cross sectional view, taken along line A-A of FIG. 5.

As shown in FIG. 8, when the driving device 3 is located at the initial node, the resilient member 343 is engaged with the recess 344*a*, when the driving device 3 receives the speed-changing signal to increase the gear position, the motor unit 31 rotates the output shaft 32 counter clockwise. The resilient member 343 of the inner ring 341 is compressed and rotates toward the top position of the recess 344*b* to engage the resilient member 343 with the recess 344*b*. In the meanwhile, the disk 33 rotates counter clockwise to retract the operation cable 5 so that the speed-changing device 6 changes its speed. On the contrary, when the driving device 3 is located at the final node, the resilient member 343 is engaged with the recess 344*d*, when the driving device 3 receives the speed-changing signal to decrease the gear position, the motor unit 31 rotates the output shaft 32 clockwise. The resilient member 343 of the inner ring 341 is compressed and rotates toward the top position of the recess 344*c* so that the disk 33 releases the operation cable 5 so as to change the speed of the speed-changing device 6.

Figure 9:
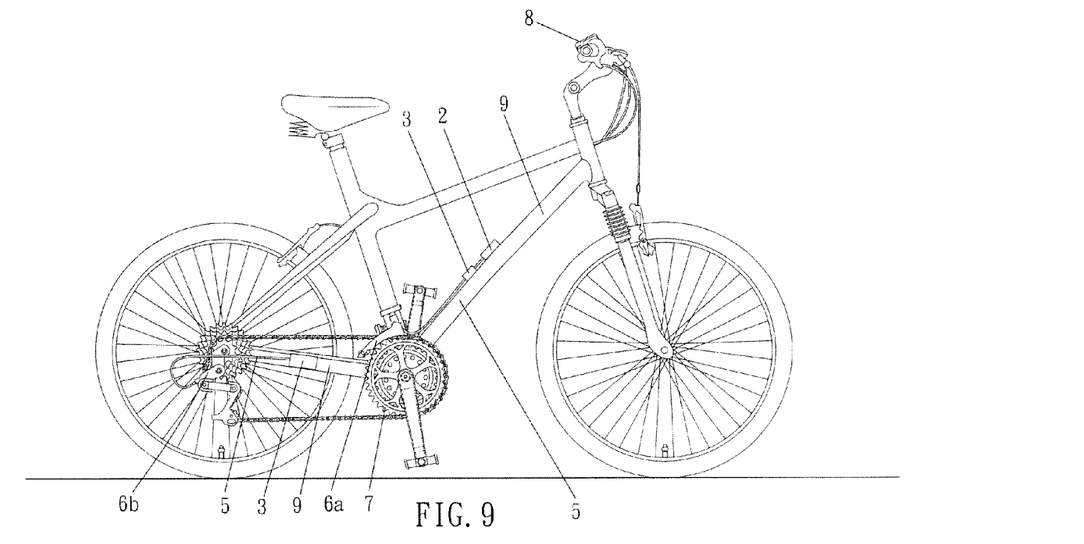
FIG. 9 shows that the first embodiment of the automatic gear shifting system of the present invention is applied to the front speed-changing device and the rear speed-changing device of the two-wheel electric vehicle.
Figure 10:
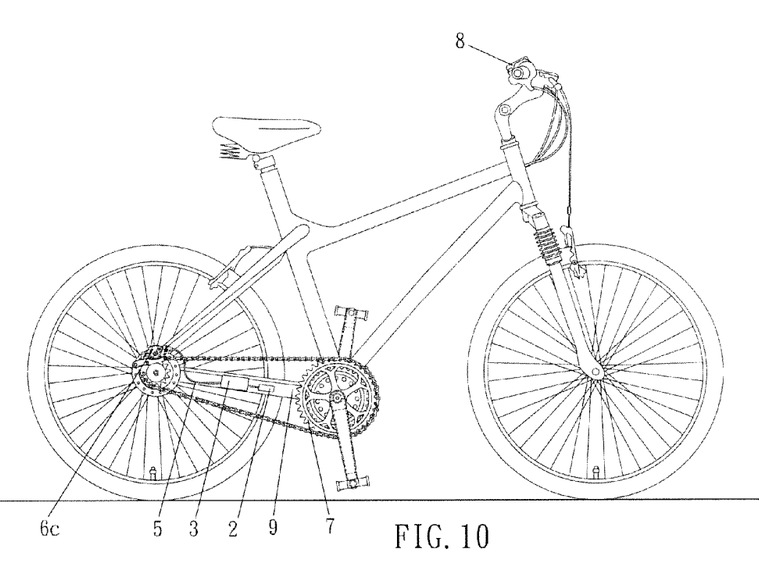
FIG. 10 shows that the first embodiment of the automatic gear shifting system of the present invention is applied to the internal speed-changing device of the two-wheel electric vehicle.

FIG. 9 shows that the two-wheel electric vehicle has the front speed-changing device 6*a* and the rear speed-changing device 6*b*. The outer ring 342 is connected to the frame 9 and one of the driving devices 3 is connected to the front speed-changing device 6*a* by the operation cable 5, and the other one of the driving devices 3 is connected to the rear speed-changing device 6*b*. As shown in FIG. 10 which shows the two-wheel electric vehicle has an internal speed-changing device 6*c*. The driving device 3 is connected to the internal speed-changing device 6*c* by the operation cable 5. The driving device 3 is not restricted by the front speed-changing device 6*a*, the rear speed-changing device 6*b* or the internal speed-changing device 6*c*. The driving device 3 has a simple structure, low manufacturing cost and is easily be maintained. The driving device 3 can be conveniently installed to any two-wheel electric vehicle.

Figure 11:
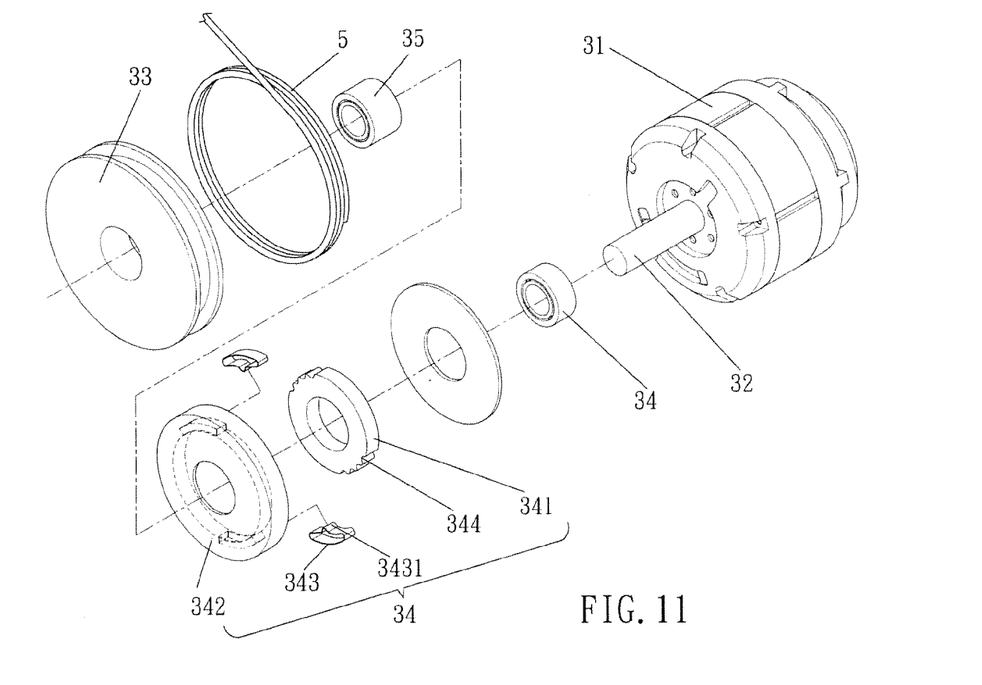
FIG. 11 is an exploded view to show the second embodiment of the automatic gear shifting system of the present invention.
Figure 12:
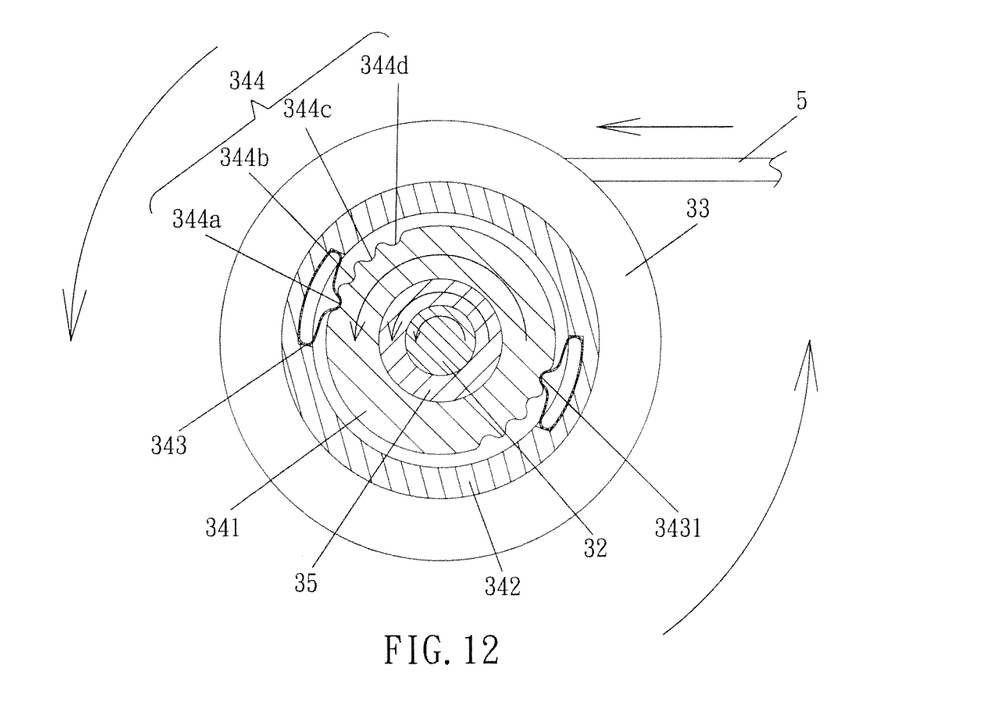
FIG. 12 shows the cross sectional view of the second embodiment of the automatic gear shifting system of the present invention.

FIGS. 11 and 12 show the second embodiment of the present invention and which differs from the first embodiment is that the inner periphery of the outer ring 342 has at least one resilient member 343 fixed thereto and the at least one resilient member 343 has a contact portion 3431. The inner ring 341 has multiple recesses 344 defined in the outer periphery thereof. The number of the recesses is larger than that of the at least one resilient member 343. The recesses 344 are located corresponding to the contact portions 3431 which are engaged with the recesses 344 to form the nodes.

The detection unit 1 detects the operation status of the two-wheel electric vehicle and sends a detected signal to the processing unit 2. The operation status includes the driving force, the driving speed, the power consumption, the electric-assistance level, the present gear position and the slope where the vehicle is operated. The operation status includes the driving force, the driving speed, the power consumption, the electric-assistance level, the present gear position and the slope where the vehicle is operated. By the adjusting the proper gear position and the driving power of the motor system 4, the two-wheel electric vehicle is operated at proper torque and has higher performance.

The motor system 4 provides the driving power to the two-wheel electric vehicle. The driving device 3 and the motor system 4 are cooperated by the speed-changing signal to allow the gear shifting to be operated smoothly so as to provide the proper torque to the two-wheel electric vehicle and avoid unnecessary electric power consumption.

The processing unit 2 filters the noisy and scattered information detected from the detection unit 1 and accurately calculates the slope of the road so that the proper gear position can be shifted. The filtering of detected signal can also avoid from providing incorrect speed-changing signal which makes the motor system 4 to respond unstably to affect the safety of the user.

The driving device 3 generates a feed-back signal to the processing unit 2 when the gear shifting 6 to the speed-changing device is completed. The processing unit 2 is acknowledged the gear position of the speed-changing device 6. The processing unit 2 receives, filters and analyzes the detected signal to the feed-back signal, and generates a speed-changing signal, corresponding to the detected signal and the feed-back signal, to the driving device 3 and the motor system 4 so as to precisely adjust the gear position. The display unit 8 receives the display signal and displays the gear position of the speed-changing device 6 so that the user is acknowledged the current gear position.

The driving device 3 is connected to the front speed-changing device 6*a*, the rear speed-changing device 6*b* or the internal speed-changing device 6*c*. The outer ring 342 is connected to the frame 9 of the two-wheel electric vehicle as shown in FIGS. 9 and 10 so that the driving device 3 is not restricted by the front speed-changing device 6*a*, the rear speed-changing device 6*b* or the internal speed-changing device 6*c*. The driving device 3 has a simple structure, low manufacturing cost and is easily be maintained. The driving device 3 can be conveniently installed to any two-wheel electric vehicle.

The motor system 4 can be a coaxial motor, an assembled motor or a tilt motor. The users may use any of the motors, according to needs, to be installed to the two-wheel electric vehicle. The present invention can be used in wide range of applications.

While we have shown and described the embodiment in accordance with the present invention, it should be clear to those skilled in the art that further embodiments may be made without departing from the scope of the present invention.

What is claimed is:

1. An automatic gear shifting system of a two-wheel electric vehicle, comprising:

a detection unit for detecting operation status of the two-wheel electric vehicle and sending a detected signal;

a processing unit connected to the detection unit, a driving device and a motor system located at a mediate portion of the vehicle, the processing unit receiving, analyzing and filtering the detected signal and generating a speed-changing signal, corresponding to the detected signal, coupled to the driving device and the motor system so as to shift gears by cooperation of the driving device and the motor system;

the driving device having a motor unit which is connected to the processing unit and has an output shaft, the output shaft of the motor unit being coupled to a disk and a control member which has multiple receptive nodes for receipt of a deformable resilient member, the disk being connected to a speed-changing device by an operation cable, the speed-changing device having multiple gear positions corresponding respectively to the multiple receptive nodes of the control member, an interior of the disk being drivingly coupled to the output shaft and the operation cable being connected between an outside portion of the disk and the speed-changing device, the motor unit receiving the speed-changing signal to drive the output shaft to incrementally move the deformable resilient member into a different receptive node of the control member and to correspondingly rotate the disk so that the operation cable is driven to change the gear position of the speed-changing device, and a motor system adapted to be located at the mediate portion of the vehicle and being mechanically connected to a chainwheel, the motor system providing power to the two-wheel electric vehicle by the speed-changing signal and the shifting of the speed-changing device.

2. The automatic gear shifting system as claimed in claim 1, wherein the driving device generates a feed-back signal to the processing unit when the gear shifting to the speed-changing device is completed, the processing unit is acknowledged the gear position of the speed-changing device, the processing unit receives and analyzes the detected signal to the feed-back signal, and filters the detected signal and generates a speed-changing signal, corresponding to the detected signal and the feed-back signal, to the driving device.

3. The automatic gear shifting system as claimed in claim 2, wherein a display unit is connected to the processing unit which generates a display signal to the display unit when receiving the feed-back signal, the display unit receives the display signal to display the gear position of the speed-changing device.

4. The automatic gear shifting system as claimed in claim 1, wherein the operation status includes driving force, driving speed, power consumption, electric-assistance level, present gear position and slope, the detection unit comprises a slope detection member, a speed detection member, a torque detection member and a pressure detection member, the slope detection member has a gravity sensor (G-sensor) or a leveling device.

5. The automatic gear shifting system as claimed in claim 1, wherein the processing unit is electrically connected to the driving device and the motor system, the processing unit filters noisy and scattered signals to provide stable control signals.

6. The automatic gear shifting system as claimed in claim 1, wherein the speed-changing device is a front speed-changing device, a rear speed-changing device or an internal speed-changing device.

7. The automatic gear shifting system as claimed in claim 1, wherein the motor system is a coaxial motor, an assembled motor or a tilt motor.

8. A driving device comprising:

a motor unit, a disk and a control member, the motor unit having an output shaft which is drivingly coupled to the disk and the control member, an interior of the disk being coupled to the output shaft and an operation cable connected to outside of the disk, the operation cable being connected to a speed-changing device which has multiple gear positions, the control member having an inner ring and an outer ring, the outer ring being adapted to be fixed to a frame of a two-wheel electric vehicle and the inner ring being coupled to the output shaft, the inner ring having multiple receptive nodes for receipt of a deformable resilient member disposed on the outer ring, the receptive nodes being located corresponding respectively to the gear positions of the speed-changing device, when the motor unit receives a gear-shifting signal, the inner ring is rotated to deform the deformable resilient member and incrementally change the receptive node into which the deformable resilient member is received, and the disk thereby responsively drives the operation cable to shift the gear position of the speed-changing device.

9. The driving device as claimed in claim 8, wherein the deformable resilient member has a contact portion, the outer ring has multiple recesses defined in an inner periphery thereof, the recesses are located corresponding to the contact portions which are engaged with the recesses to form the receptive nodes.

10. The driving device as claimed in claim 8, wherein the deformable resilient member has a contact portion, the inner ring has multiple recesses defined in an outer periphery thereof, a number of the recesses is larger than that of the at least one resilient member, the recesses are located corresponding to the contact portions which are engaged with the recesses to form the receptive nodes.

* * * * *